United States Patent
Tsukahara et al.

[11] Patent Number: 5,332,801
[45] Date of Patent: Jul. 26, 1994

[54] PROCESS FOR PREPARING MODIFIED-POLYPHENYLENE ETHER

[75] Inventors: Toru Tsukahara; Mitsutoshi Aritomi, both of Yokkaichi, Japan

[73] Assignee: Mitsubishi Petrochemical Co., Ltd., Tokyo, Japan

[21] Appl. No.: 16,090

[22] Filed: Feb. 10, 1993

Related U.S. Application Data

[60] Division of Ser. No. 841,412, Feb. 26, 1992, abandoned, which is a continuation of Ser. No. 681,057, Apr. 5, 1991, Pat. No. 5,120,800.

[30] Foreign Application Priority Data

| Apr. 10, 1990 | [JP] | Japan | 2-92997 |
| May 16, 1990 | [JP] | Japan | 2-124040 |
| May 30, 1990 | [JP] | Japan | 2-138593 |
| Jul. 11, 1990 | [JP] | Japan | 2-181672 |
| Aug. 23, 1990 | [JP] | Japan | 2-219987 |
| Sep. 6, 1990 | [JP] | Japan | 2-234591 |

[51] Int. Cl.$^5$ .............. C08G 61/00; C08G 75/00
[52] U.S. Cl. .............. 525/397; 525/390; 525/393
[58] Field of Search .............. 525/397, 390, 393; 528/205

[56] References Cited

U.S. PATENT DOCUMENTS

5,120,800  6/1992  Tsukahara et al. .............. 525/390

Primary Examiner—John Kight, III
Assistant Examiner—Terressa Mosley
Attorney, Agent, or Firm—Oblon, Spivak, McClelland, Maier & Neustadt

[57] ABSTRACT

Disclosed are processes for preparing a process for preparing a modified polyphenylene ether which comprises reacting any one of a borane compound having at least one boronhydrogen bond, an $\alpha,\beta$-unsaturated carbonyl compound or a mercaptane having a carbonyl group, a hydroxyl group or an alkoxysilyl group with a polyphenylene ether having a carbon-carbon unsaturated bond in a substituent, and optionally oxidizing the resulting borane-modified PPE under alkaline conditions.

5 Claims, 9 Drawing Sheets

PROCESS FOR PREPARING MODIFIED-POLYPHENYLENE ETHER

This is a division of application Ser. No. 07/841,412, filed on Feb. 26, 1992, now abandoned, which is a continuation of application Ser. No. 07/681,057 filed Apr. 5, 1991 now U.S. Pat. No. 5,120,800.

BACKGROUND OF THE INVENTION

This invention relates to a process for preparing a polyphenylene ether capable of having optional number of a reactive functional group(s) in a molecule, which functional group is capable of physically or chemically binding different kinds of polymers.

More specifically, it relates to a process for preparing various kinds of modified polyphenylene ethers composed of reacting a polyphenylene ether having optional number of a carbon-carbon unsaturated bond with various kinds of functionalizing agent.

When preparing a polymer blend, a polyphenylene ether (hereinafter abbreviated to as "PPE") is generally incompatible with other resins except for specific resins and has poor affinity. Thus, when two components of PPE and the other resin are simply mixed, phase separation structure which is stable in energy is shown so that adhesiveness at interface of the two phase structure is not so good. Therefore, mechanical strength and impact resistance are lowered and serious problems of causing delamination easily at molding, etc. are shown.

In order to solve the above problems, it is effective to use a blocked material or grafted material comprising a segment having affinity to both PPE and a polymer to be blended, as a compatibilizing agent. For synthesizing them, there are cases where a bifunctional small molecule such as maleic anhydride is used as a binder or polymers each having a functional group which react with each other are bound. In either of the cases, important are kinds of functional groups in the polymer molecule and number thereof.

As an example of these, there has been employed the method in which unsaturated carboxylic acid, unsaturated imide or unsaturated epoxide, or the like are mixed, kneaded to effect reaction. However, in this method, control of numbers of the functional groups which can be introduced in the polymer or kinds thereof is limited.

Also, there have been proposed that various functional groups are introduced by using a phenolic hydroxyl group at the terminal of PPE as a reaction cite. For example, there are a terminal carboxylic acid anhydride modified product as disclosed in Japanese Provisional Patent Publication No. 199754/1988 or Japanese Provisional PCT Publication No. 500456/1987, a terminal alcoholic hydroxy-modified product as disclosed in Japanese Provisional PCT Publication No. 503391/1988, or a terminal glycidyl-modified product as disclosed in U.S. Pat. No. 4,732,937. However, in these polymers, numbers of reaction cites and functional groups are at most one per one polymer molecule so that number of functional group is not in optimum nor satisfied. Also, in Japanese Provisional Patent Publication No. 128056/1988, it has been disclosed that the modified product of PPE using an $\alpha,\beta$-unsaturated carbonyl compound represented by maleic anhydride becomes a compatibilizing agent for a PPE series blended material. In these cases, a content of the maleic anhydride of modified PPE is at most 1% by weight so that such a content is insufficient as a compatibilizing agent.

On the other hand, as an effective method of introducing a functional group, there is a reaction of a boran compound. It has been known that the borane compound can convert into various functional groups with good efficiency by its characteristic reaction. By applying the compound to polymer molecules, it can become an available precursor for functionallized polymer.

These borane compounds can be easily formed by an electrophilic addition reaction of a boron-hydrogen bond to a carbon-carbon unsaturated bond, i.e. the so-called hydroboration reaction. For example, it has been shown that these compounds can be used for converting into many functional groups selectively and good efficiency such as alcoholation (H. C. Brown, Organoboranes in Organic Synthesis, Marcel Dekker (1973)), amination (H. C. Brown, et al., Journal of American Chemical Society, 1964, 86 3565, 1966, 88 2870), esterification (H. C. Brown et al., Journal of American Chemical Society, 1968, 90 818), cyanization (H. C. Brown et al., Journal of American Chemical Society, 1969, 91 6854, 1970, 90 5790) and ketonization (H. C. Brown et al., Journal of American Chemical Society, 1969, 91 6852) and so on.

As for the reaction of the borane compounds as mentioned above, famous research has been carried out in detail by H. C. Brown (H. C. Brown, Organic Synthesis via Branes, John-Wiley (1975), etc.) and applicable range has rapidly been expanded in recent years.

Also, as an effective method of introducing a functional group, there is a reaction of mercaptane having a carbonyl group, hydroxyl group or an alkoxysilyl group. It has been known that these mercaptans are added to a carbon-carbon unsaturated bond with good efficiency mainly by a radical reaction. By applying the compound to a polymer having a carbon-carbon unsaturated bond, functionalization of a polymer can be realized.

However, no report has been made about research in which hydroboration reaction and a subsequent reaction of borane are applied to PPE having an unsaturated bond such as a resin obtained by oxidation polymerization of 2-allyl-6-methylphenol and 2,6-dimethylphenol (for example, U.S. Pat. No. 3,422,062). Further, there is no example that an $\alpha,\beta$-unsaturated carbonyl compound, etc. is reacted to PPE. Further, it has been also not known that the reaction of the above mercaptane is applied to.

SUMMARY OF THE INVENTION

An object of the present invention is to provide a process for preparing a borane-modified PPE which is a precursor for obtaining PPE having various reactive functional groups in the molecule with optional numbers in order to improve compatibility of a polymer blend and a resin composition containing the same.

Also, another object of the present invention is to provide a process for preparing an alcoholic hydroxyl group-modified PPE having alcoholic hydroxyl groups as a reactive functional group in the molecule with optional numbers by using the above borane-modified PPE and a resin composition containing the same.

A further object of the present invention is to provide a process for preparing an $\alpha,\beta$-unsaturated carbonyl compound-modified PPE in which a larger amount than the conventional one, i.e. 1.0 to 10% by weight of an α,β-unsaturated carbonyl compound is introduced therein and a resin composition containing the same.

A fourth object of the present invention is to provide a process for preparing a carbonyl group-modified PPE having carbonyl groups as a reactive functional group in the molecule with optional numbers and a resin composition containing the same.

A fifth object of the present invention is to provide a process for preparing a hydroxyl group-modified PPE having hydroxyl groups as a reactive functional group in the molecule with optional numbers and a resin composition containing the same.

A sixth object of the present invention is to provide a process for preparing an alkoxysilyl group-modified PPE having alkoxysilyl groups as a reactive functional group in the molecule with optional numbers and a resin composition containing the same.

The present invention is a process for preparing a borate-modified PPE which comprises reacting a borate compound having at least one boron-hydrogen bond and represented by the formula:

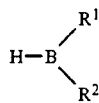  (I)

wherein $R^1$ and $R^2$ independently represent a hydrogen atom, an alkyl group, an alkenyl group, an aryl group, a hydrocarbonoxy group or a halogen atom,
with PPE having a carbon-carbon unsaturated bond in a substituent.

Also, the present invention is a process for preparing an alcoholic hydroxyl group-modified PPE which comprises reacting a borane compound having at least one boron-hydrogen bond and represented by the formula:

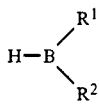  (I)

wherein $R^1$ and $R^2$ have the same meanings as defined above,
with PPE having a carbon-carbon unsaturated bond in a substituent, and then reacting an oxidizing agent to the formed borane-modified PPE under an alkaline condition.

Further, the present invention is a process for preparing an α,β-unsaturated carbonyl compound-modified PPE which comprises reacting an α,β-unsaturated carbonyl compound with PPE having a carbon-carbon unsaturated bond in a substituent.

Furthermore, the present invention is a process for preparing a carbonyl group-modified PPE which comprises reacting a mercaptan having a carbonyl group and represented by formula:

$(HS)_m—R^3—(COR^4)_n$  (II)

wherein m and n each represent an integer of 1 to 4, $R^3$ represents a divalent to hexavalent saturated aliphatic hydrocarbon group having 1 to 20 carbon atoms, an aromatic hydrocarbon group or a hydrocarbon group containing an amide bond or an ester bond, and $R^4$ represents an alkali metal oxy group, a hydrogen atom, a hydroxyl group, an aryl group, an alkyl group having 1 to 20 carbon atoms, a halogenated alkyl group or a hydrocarbonoxy group,
with PPE having a carbon-carbon unsaturated bond in a substituent.

Moreover, the present invention is a process for preparing a hydroxyl group-modified PPE which comprises reacting a mercaptane having a hydroxyl group and represented by the formula:

$(HS)_p—R^5—(OH)_q$  (III)

wherein p and q each represent an integer of 1 to 4, and $R^5$ represents a divalent to hexavalent saturated hydrocarbon group having 1 to 20 carbon atoms, an aromatic group or a hydrocarbon group containing an ether bond, amide bond or ester bond,
with PPE having a carbon-carbon unsaturated bond in a substituent.

The present invention further relates to a process for preparing an alkoxysilyl group-modified PPE which comprises reacting a mercaptan having an alkoxysilyl group and represented by the formula:

$(HS)_r—R^6—[Si\ (R^7)_t(OR^8)_{3-t}]_s$  (IV)

wherein r and s each represent an integer of 1 to 4, $R^6$ represents a divalent to hexavalent saturated hydrocarbon group having 1 to 20 carbon atoms or an aromatic group, t is 0, 1 or 2, $R^7$ represents a hydrogen atom, or a saturated hydrocarbon group having 1 so 20 carbon atoms or an aromatic group each of which may have or may not have a mercapto group, and $R^8$ represents a hydrogen atom, a saturated hydrocarbon group having 1 to 20 carbon atoms or an aromatic group,
with PPE having a carbon-carbon unsaturated bond in a substituent.

BRIEF DESCRIPTION OF THE DRAWINGS

FIG. 1 is a $^1$H-NMR chart of PPE used in Example 1a;

FIG. 2 is a $^1$H-NMR chart of the borane-modified PPE obtained in Example 1a;

FIG. 4 is an infrared absorption spectrum of the alcoholic hydroxyl group-modified PPE obtained in Example 2a;

FIG. 9 is a $^1$H-NMR chart of the alkoxysilyl group-modified PPE obtained in Example 6a.

DESCRIPTION OF THE PREFERRED EMBODIMENTS

Figure 1:
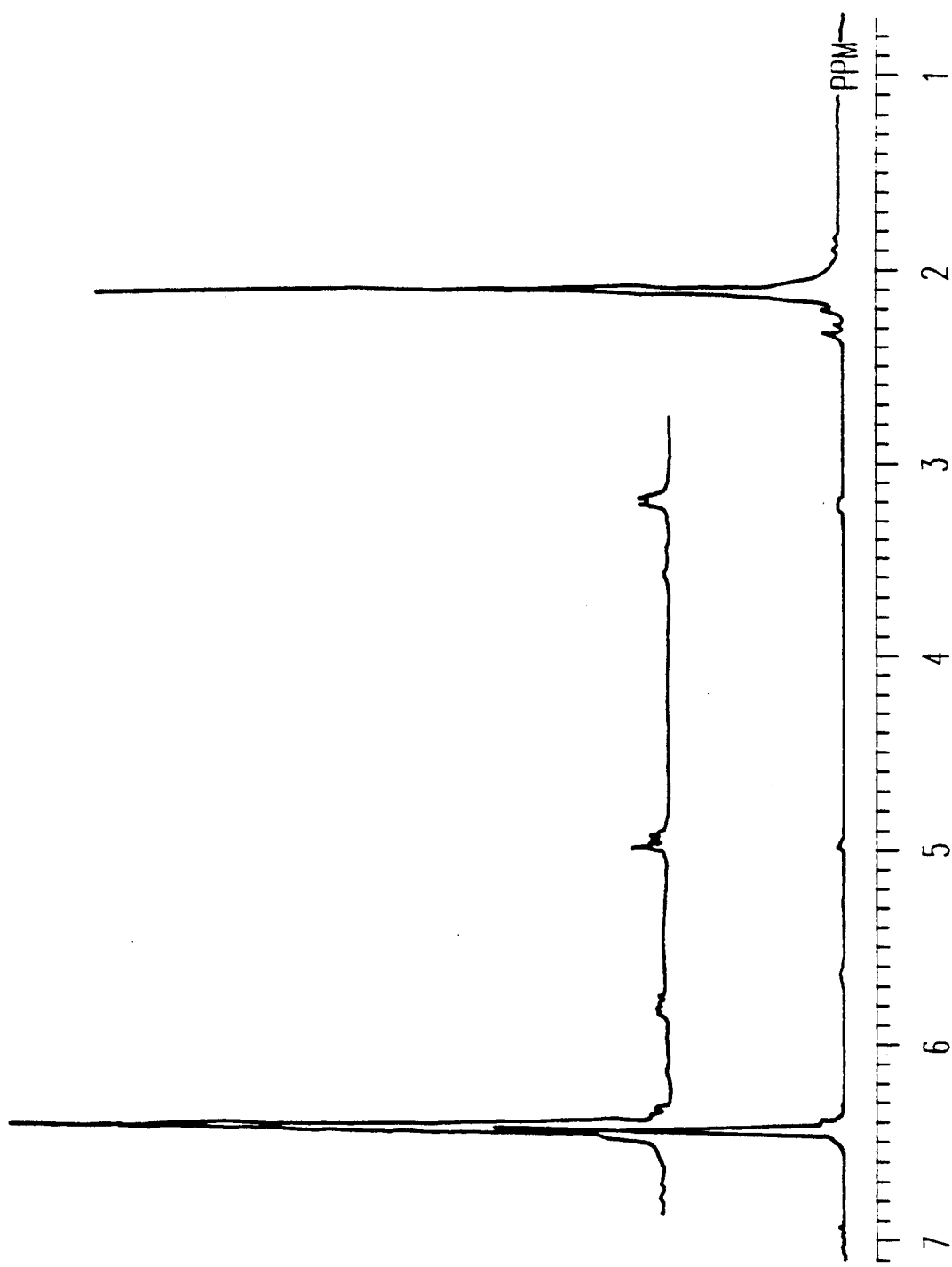

In the following, the present invention will be explained in more detail.

The PPE having a carbon-carbon unsaturated bond in a substituent to be used in the present invention is a PPE obtained by subjecting to oxidation polymerization of at least one of the phenol represented by the formula:

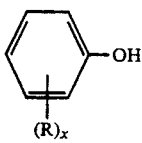

(V)

wherein x represents an integer of 1 to 4, and R independently represents a halogen atom, a primary or secondary alkyl group having 1 to 20 carbon atoms, an aryl group, a haloalkyl group, an aminoalkyl group, a hydrocarbonoxy group or a halohydrocarbonoxy group in which a halogen atom and an oxygen atom are bonded through at least two carbon atoms, and at least one of R represents a substituent having carbon-carbon double bond and/or carbon-carbon triple bond.

Specific examples of the phenol may include 2-allylphenol, 2,6-diallylphenol, 2-allyl-6-methylphenol, 2-allyl-5-chlorophenol, 2-allyl-3-methoxyphenol, 2-allyl-3-isobutyl-6-methylphenol, 2-allyl-6-ethylphenol and 2-geranyl-6-methylphenol. Among these, preferred are 2,6-diallylphenol, 2-allyl-6-methylphenol, 2-allyl-6-ethylphenol and 2-geranyl-6-methylphenol.

Further, the above PPE may be those in which the above phenol represented by the formula (V) is subjected to oxidation copolymerization with phenol or a phenol having, as a substituent(s), a halogen atom, a primary or secondary alkyl group, an aryl group, a haloalkyl group, an aminoalkyl group, a hydrocarbonoxy group or a halohydrocarbonoxy group in which a halogen atom and an oxygen atom are bonded through at least two carbon atoms. Representative examples of such a phenol may include o-, m- or p-cresol; 2,6-, 2,5-, 2,4- or 3, 5-dimethylphenol; 2,6-diphenylphenol; 2,6-diethylphenol; 2,3,5- or 2,3,6-trimethylphenol or 2-methyl-6-t-butylphenol, preferably 2,6-dimethylphenol, a phenol mixture comprising a large amount of 2,6-dimethylphenol and a small amount of at least one phenol selected from 2,3,6-trimethylphenol, and p- or p-cresol.

Also, a polymer in which the above phenol is contained as a main component and a polyvalent hydroxy aromatic compound such as bisphenol A, tetrabrombisphenol A, resorcin, hydroquinone, 2,2-his (3',5'-dimethyl-4'-hydroxy-phenyl)propane, bis(3,5-dimethyl-4-hydroxy-phenyl)methane, 3,3',5,5'-tetramethyl-4,4'-dihydroxybiphenyl and 4,4'-dihydroxybiphenyl is copolymerized may be used.

Preparation of the above polymer can be carried out as in the conventional oxidation polymerization of PPE and disclosed in, for example, U.S. Pat. Nos. 3,422,062, 3,306,874, 3,306,875, 3,257,257 and 3,257,358.

A catalyst to be used in the oxidation polymerization is not particularly limited, and may be used any catalyst which is capable of providing a desired polymerization degree. In this field of the art, many catalyst systems have been known such as cuprous salt-amine, cuptic salt-amine-alkali metal hydroxide, and manganese salt-primary amine. Further, those in which part of the constituting component of the polymer is modified by a catalyst component or a polymer solvent component, or modified by heat or oxygen, during preparation and molding steps may be also used. A range of the polymerization degree is not specifically limited, but it is too low, compatibility is lowered to cause a problem. Therefore, a lower limit of the PPE for practical use is an intrinsic viscosity in chloroform solution at 30° C. of 0.1 dl/g or so, preferably 0.2 dl/g or more, more preferably 0.3 dl/g or more.

The number of the carbon-carbon unsaturated bond in the PPE is not particularly limited, but when it is supposed to use as a compatibilizing agent, a ratio of a unit containing unsaturated bond is preferably 1 to 30, more preferably 1 to 20 in one molecule.

As the specific examples of the borane compound (i) to be used in the present invention, there may be mentioned the compounds as exemplified in the following group A:

Group A: diborane, complex compounds of borane and Lewis base such as borane-tetrahydrofuran complex, borane-triethylamine complex, borane-pyridine complex, borane-ammonium complex, borane-t-butylamine complex, borane-N,N-diethylaniline complex, borane-N,N-diisopropylethylamine complex, borane-dimethylamine complex, borane-4-dimethylaminopyridine complex, borane-4-ethylmorpholine complex, borane-2,6-lutidine complex, borane-4-methylmorpholine complex, borane-methylsulfide complex, borane-morpholine complex, borane-1,4-thioxane complex, borane-4-phenylmorpholine complex, borane-piperidine complex, borane-poly(2-vinylpyridine) complex, borane-pyridine complex, boranetributylphosphine complex and borane-triphenylphosphine complex, 3-(methylthio)propylborane, thexylborane, catechal borane, 9-borabicyclo[3.3.1]nonane (abbreviated name: 9-BBN), diazaamylborane, dichtoroborane and dicyclohexylborane. Among these, preferred are borane-tetrahydrofuran complex, borane-pyridine complex, borane-methylsulfide complex and 9-BBN since they are easily available and chemically stable.

The borane-modified PPE to be prepared in the present invention can be obtained by the following hydroboration reaction of PPE (V) having a carbon-carbon unsaturated bond in a substituent and the borane compound (I) having at least one boron-hydrogen bond, and has the structure in which boron atom is directly bonded to PPE.

The hydroboration reaction of the present invention is carried out in an inert gas atmosphere, preferably in nitrogen gas or argon gas atmosphere in the presence of a solvent. The solvent is not specifically limited so long as it is a sufficiently dried non-protonic solvent but preferably non-protonic polar solvent such as tetrahydrofuran, dioxane and diglyme.

Also, an amount of the borane compound is not particularly limited, but preferably a number of the boron-hydrogen bond is not less than that of the carbon-carbon unsaturated bond, more preferably 2-times or more. On the other hand, when a functional group such as amino group is substituted for the borane group of an organoborane compound, there is a reaction in which tri-substituted derivative is preferably used in such a case wherein a borane compound having 2 or 3 boron-hydrogen bonds is used, it is suitable that number of the boron-hydrogen bonds is not more than that of the carbon-carbon unsaturated bonds.

The reaction temperature of the above reaction is in the range of −10° C. to 150° C., and the higher temperature proceeds the reaction advantageously. When a borane compound having 2 or 3 boron-hydrogen bonds is used, gelation of PPE will occur due to hydroboration reaction whereby the reaction rate of the carbon-carbon unsaturated bond is undesirably lowered. In this case, the reaction temperature is preferably in the range of 40° to 110° C.

The reaction time may vary depending on the reaction conditions such as the reaction temperature, but generally the reaction is substantially completed within 30 minutes, and the reaction time of one hour gives sufficient results.

The borane-modified PPE formed by the above hydroboration reaction can be easily converted into an alcoholic hydroxyl group-modified PPE by, without isolation of the formed PPE, reacting an oxidizing agent to the borane-carbon bond portion under alkaline conditions.

As the oxidizing agent hydrogen peroxide is most suitable and oxyamine and air may be also used.

A concentration of hydrogen peroxide may be optional but preferably an aqueous solution with a concentration of 20 to 40% by weight in view of safety and reaction efficiency. An amount of hydrogen peroxide to be added is not particularly limited so long as it is not less than the molar number of the borane group, but preferably 3 to 20 times, more preferably 5 to 15 times of the borane group.

For making alkaline conditions, it is preferred to use an alkali metal hydroxide, alkaline earth metal hydroxide, and the like. Among these, sodium hydroxide and potassium hydroxide are particularly preferred. An amount thereof is in the range of 1/6 to 3 times, more preferably ¼ to 2 times based on the molar number of hydrogen peroxide to be used.

The reaction temperature is in the range of −10° to 100° C., but preferably 10° to 70° C., more preferably 30° to 50° C.

The reaction time is preferably within 30 minutes after addition of hydrogen peroxide and the reaction is completed within 3 hours.

Specific examples of the $\alpha,\beta$-unsaturated carbonyl compound to be used in the present invention will be mentioned in the following group B.

Group B: $\alpha,\beta$-unsaturated dicarboxylic acids such as maleic acid, chloromaleic acid, citraconic acid and iraconic acid; unsaturated monocarboxylic acid such as acrylic acid, 2-furoic acid, 3-furoic acid, crotonic acid, vinylacetic acid, methacrylic acid, pentenoic acid and angelic acid; acid anhydrides of these $\alpha,\beta$-unsaturated dicarbonic acid or unsaturated monocarboxylic acid; and reaction products of epichlorihydrin and the above $\alpha,\beta$-unsaturated dicarboxylic acid or unsaturated monocarboxylic acid of unsaturated epoxy compound such as glycidyl maleate, glycidyl acrylate and glycidyl methacrylate. Among these, preferred are maleic acid, acrylic acid, methacrylic acid, maleic anhydride, glycidyl methacrylate and glycidyl acrylate, more preferred are maleic anhydride, glycidyl methacrylate and glycidyl acrylate.

The reaction of the PPE (V) having a carbon-carbon unsaturated bond in the substituent and the $\alpha,\beta$-unsaturated carbonyl compound of the present invention is practiced in a solvent such as benzene, toluene, xylene, chlorobenzene, decalin and tetralin.

The reaction is preferably carried out by uniformly mixing and dissolving the above PPE and $\alpha,\beta$-unsaturated carbonyl compound with a molar ratio of the carbon-carbon unsaturated bond in the PPE and the $\alpha,\beta$-unsaturated carbonyl compound in the range of 1:1 to 1:20, more preferably 1:5 to 1:15. At this time, the PPE concentration in the solvent is preferably 1 to 30% by weight, more preferably 5 to 20% by weight.

In order to effect this modification reaction smoothly and rapidly, it is effective to add a radical initiator such as organic peroxides including benzoyl peroxide, di-t-buty peroxide, dicumyl peroxide and t-butyl peroxybenzoate; and azo compounds including azobisisobutyronitrile and azobisisovaleronitrile. The reaction temperature is preferably in the range of 30° to 250° C., more preferably 50° to 150° C. The reaction time may vary depending on the conditions such as a temperature, concentration and the kinds of a radical initiator, but preferably 0.5 to 10 hours, more preferably 2 to 6 hours.

Further, the reaction of the PPE (V) having a carbon-carbon unsaturated bond in the substituent and the $\alpha,\beta$-unsaturated carbonyl compound of the present invention may be carried out by the melt and kneading method using an extruder, Banbury mixer or header in the presence or absence of a radical initiator. In this case, the PPE, $\alpha,\beta$-unsaturated carbonyl compound and radical initiator are used the same ones as those mentioned above. In the melt and kneading method, an amount of the $\alpha,\beta$-unsaturated carbonyl compound is preferably 1.0 to 10% by weight, more preferably 1.0 to 5.0% by weight based on the PPE. The reaction can be practiced in the temperature range of 150° to 380° C., and preferably 230° to 320° C. The reaction time is preferably 0.3 to 10 minutes, more preferably 0.5 to 5 minutes.

In the present invention, an amount of the $\alpha,\beta$-unsaturated carbonyl compound in the PPE is required to be 1.0% by weight or more due to realize the function as the compatibilizing agent, and preferably 1.0 to 10% by weight in view of the cost, more preferably 1.0 to 5% by weight.

Specific examples of the mercaptan having a carbonyl group of the formula (II) to be used in the present invention are mentioned in the following group C.

Group C: mercaptoacetic acid, 2-mercaptopropionic acid, 3-mercaptopropionic acid, mercaptosuccinic acid, thiosalicylic acid, methyl 3-mercaptopropionate, ethyl mercaptoacetate, ethyl 2-mercaptopropionate, N-(2-mercaptopropionyl)glycine, sodium mercaptoacetate, etc. Preferred are mercaptoacetic acid, 2-mercaptopropionic acid, mercaptosuccinic acid and ethyl mercaptoacetate, and particularly preferred is mercaptoacetic acid.

Specific examples of the mercaptan having a hydroxyl group of the formula (III) to be used in the present invention are mentioned in the following group D.

Group D: 2-mercaptoethanol, 3-mercaptopropanol, 2-mercaptopropanol, 2-mercapto-1-methylethanol, 4-mercaptobutanol, 3-mercapto-2-butanol, 1-mercapto-2-butanol, 2-mercaptobutanol, 3-mercapto-2-methylpropanol, 2-mercapto-1,1-dimethylethanol, 2-mercapto-2,2-dimethylethanol, 3-mercapto-1,2-dipropanediol, 2-mercaptophenol, 3-mercaptophenol, 4-mercaptophenol, 2-mercaptoethyl-2'-hydroxyethyl ether, 2-hydroxyethyl mercaptoacetate, mercaptoacetic acid-2-hydroxyethylamide, etc. Preferred are 2-mercaptoethanol, 3-mercaptopropanol, 2-mercapto-1-methylethanol, 2-mercapto-1,1-dimethylethanol and 4-mercaptophenol, more preferred is 2-mercaptoethanol.

Specific examples of the mercaptan having an alkoxysilyl group of the formula (IV) to be used in the present invention are mentioned in the following group E.

Group E: (mercaptomethyl) trimethoxysilane, (mercaptomethyl) triethoxysilane, (mercaptomethyl)triphenoxysilane, (mercaptomethyl) dimethoxysilane, mercaptomethyl (methyl) dimethoxysilane, (mercaptomethyl)methoxysilane, mercaptomethyl (dimethyl)-methoxysilane, (2-mercaptoethyl) trimethoxysilane, (2-mercaptoethyl)dimethoxysilane, 2-mercaptoethyl(-methyl)dimethoxysilane, (2-mercaptoethyl)methoxysilane, 2-mercaptoethyl (methyl)methoxysilane, 2-mercaptoethyl (dimethyl)methoxysilane, (3-mercaptopropyl)trimethoxysilane, (3-mercaptopropyl) dimethoxysilane, (3-mercaptopropyl)methoxysilane, 3-mercaptopropyl (dimethyl)methoxysilane, (4-mercaptobutyl)trimethoxysilane, (10-mercaptodecanyl)trimethoxysilane, (15-mercaptopentadecanyl)trimethoxysilane, (20-mercaptoeicosanyl) trimethoxysilane, (3,3-dimercaptopropyl) trimethoxysilane, (2,3-dimercaptopropyl)trimethoxysilane, (1,1-dimercaptopropyl)trimethoxysilane, (1,2-dimercaptopropyl) trimethoxysilane, (1,2,3-trimercaptopropyl)trimethoxysilane, (4-mercaptophenyl)trimethoxysilane, (2-mercaptophenyl) trimethoxysilane, (3-mercaptophenyl)trimethoxysilane, (2,4-dimercaptophenyl)trimethoxysilane, (2,3-dimercaptophenyl)trimethoxysilane, (2, 6-dimercaptophenyl) trimethoxysilane, (2,4,6-trimercaptophenyl)trimethoxysilane, etc. Preferred is (3-mercaptopropyl)trimethoxysilane and the like.

The carbonyl group-modified PPE, hydroxyl group-modified PPE and alkoxysilyl group-modified PPE prepared by using a mercaptan according to the present invention can be prepared by subjecting to addition reaction of a thiol portion of the mercaptan having a carbonyl group of the formula (II), the mercaptan having a hydroxyl group of the formula (III) or the mercaptan having an alkoxysilyl group of the formula (IV) to the PPE (V) having a carbon-carbon unsaturated bond in the substituent.

The reaction of the PPE having a carbon-carbon unsaturated bond and the mercaptane of the present invention can be practiced in an aromatic hydrocarbon solvent such as benzene, toluene, xylene, chlorobenzene and trichlorobenzene; or a halogenated hydrocarbon solvent such as dichloromethane, chloroform, dichloroethane, trichloroethane and hexachloroethane.

An amount of the mercaptane to be used in the reaction is preferably 1 to 30 times, more preferably 2 to 10 times based on the molar number of the carbon-carbon unsaturated bond in the PPE.

In order to effect the above modification reaction smoothly and rapidly, it is the effective method to present a radical initiator represented by organic peroxides such as dibenzoyl peroxide, di-t-butyl peroxide, dicumyl peroxide and t-butylperoxybenzoate; and azo compounds such as azobisisobutyronitrile (hereinafter abbreviated to as "AIBN") and azobisisovaleronitrile, or to irradiate ultraviolet rays.

The reaction temperature is preferably in the range of 25° to 200° C., more preferably 40° to 150° C. The reaction time may vary depending on the various conditions such as a temperature, concentration and radical initiator, but preferably 0.5 to 15 hours, more preferably 2 to 10 hours.

Further, the reaction of the PPE (V) having a carbon-carbon unsaturated bond in the substituent and the mercaptan of the present invention may be carried out by the melt and kneading method using an extruder, Banbury mixer, kneader or laboplast mill in the presence or absence of a radical initiator. In this case, the PPE, mercaptan and radical initiator are used the same ones as those mentioned above. In the melt and kneading method, an amount of the mercaptan is preferably in the range of 0.5 to 5 times, more preferably 0.5 to 2 times based on the molar number of the carbon-carbon unsaturated bond. The reaction can be practiced in the temperature range of 150° to 380° C., and preferably 230° to 320° C. The reaction time is preferably 0.3 to 10 minutes, more preferably 0.5 to 5 minutes.

A ratio of modification due to the carbonyl group, hydroxyl group or alkoxysilyl group of these mercaptane in the present invention can be optionally controlled by the content of the alkenyl group or alkynyl group in the PPE, but as the compatibilizing agent, the number of the carbonyl group, hydroxyl group or alkoxysilyl group is preferably at least one and not more than 30 in one PPE molecule.

According to the process of the present invention, borane modified PPE which can easily bind various functional groups which is capable of becoming a compatibilizing agents for polymer blend of PPE can be provided. Further, according to the process of the present invention, an alcoholic hydroxyl group-modified PPE which is capable of becoming a compatibilizing agent for polymer blend of PPE prepared from the above borane-modified PPE can be provided. Moreover, an α,β-unsaturated carbonyl compound-modified PPE which is capable of becoming an effective compatibilizing agent for polymer blend of PPE as well as a carbonyl group-modified PPE in which carbonyl groups are bound to one polymer molecule with an optional number, a hydroxyl group-modified PPE in which hydroxyl groups are bound to one polymer molecule with an optional number and an alkoxysilyl group-modified PPE in which alkoxysilyl groups are bound to one polymer molecule with an optional number can be provided.

The hydroxyl group-modified PPE provides a product excellent in flowability at injection molding, impact resistance and flexural strength as a resin composition comprising A) 5 to 90% by weight of the alcoholic hydroxyl group-modified PPE, B) 0 to 80% by weight of a non-modified PPE and C) 90 to 10% by weight of an unsaturated carboxylic acid-modified olefin resin (where the sum of Components A, B and C is 100% by weight).

Also, a resin composition comprising 5 to 90% by weight of the α,β-ethylenic unsaturated carbonyl compound-modified PPE, 0 to 70% by weight of a non-modified PPE and 90 to 20% by weight of a polyamide resin provides a resin molded product excellent in heat resistance and impact resistance.

Further, a resin composition comprising 5 to 90% by weight 35 of the hydroxyl group-modified PPE, 0 to 80% by weight of a non-modified PPE and 90 to 10% by weight of an α,β-ethylenic unsaturated carboxylic acid-modified olefin type resin provides a resin molded product excellent in melt flowability and impact resistance.

Furthermore, a resin composition comprising 5 to 90% by weight of the alkoxysilyl group-modified PPE, 0 to 80% by weight of a non-modified PPE and 90 to 10% by weight of an alcoholic hydroxyl group-modified olefin type resin provides a resin molded product excellent in printability and impact resistance.

As the α,β-ethylenic unsaturated carboxylic acid-modified olefin type resin, there may be mentioned a maleic anhydride-grafted polypropylene, acrylic acid-modified ethylene.vinyl acetate copolymer and iraconic acid-modified polyethylene, and as the polyamide resin, there may be mentioned nylon 6, nylon 6,6, nylon 6,10 and nylon 6,12. As the alcoholic hydroxyl group-modified olefin type resin, there may be utilized a hydroxyethyl acrylate-grafted polypropylene and hydroxypropyl methacrylate-grafted polyethylene.

EXAMPLES

In the following, Examples are shown in order to explain the present invention in more detail, but the present invention is not limited by these. In the following Examples, "part" and "%" each represent "part by weight" and "% by weight", respectively.

PPE used in the following Examples is a copolymerized PPE prepared by oxidization coupling reaction of 2,6-xylenol and 2-allyl-6-methylphenol in the presence of manganese chloride/diethanol amine/dibutyl amine catalyst.

A content and reaction rate of the allyl group are calculated by $^1$H-NMR from an integrated intensity of signals derived from allyl group protons at 3.20 ppm and 4.95 ppm and those derived from aromatic ring protons at 6.5 ppm.

Also, intrinsic viscosity of PPE was measured in chloroform solvent at 30° C.

EXAMPLE 1a

Figure 2:
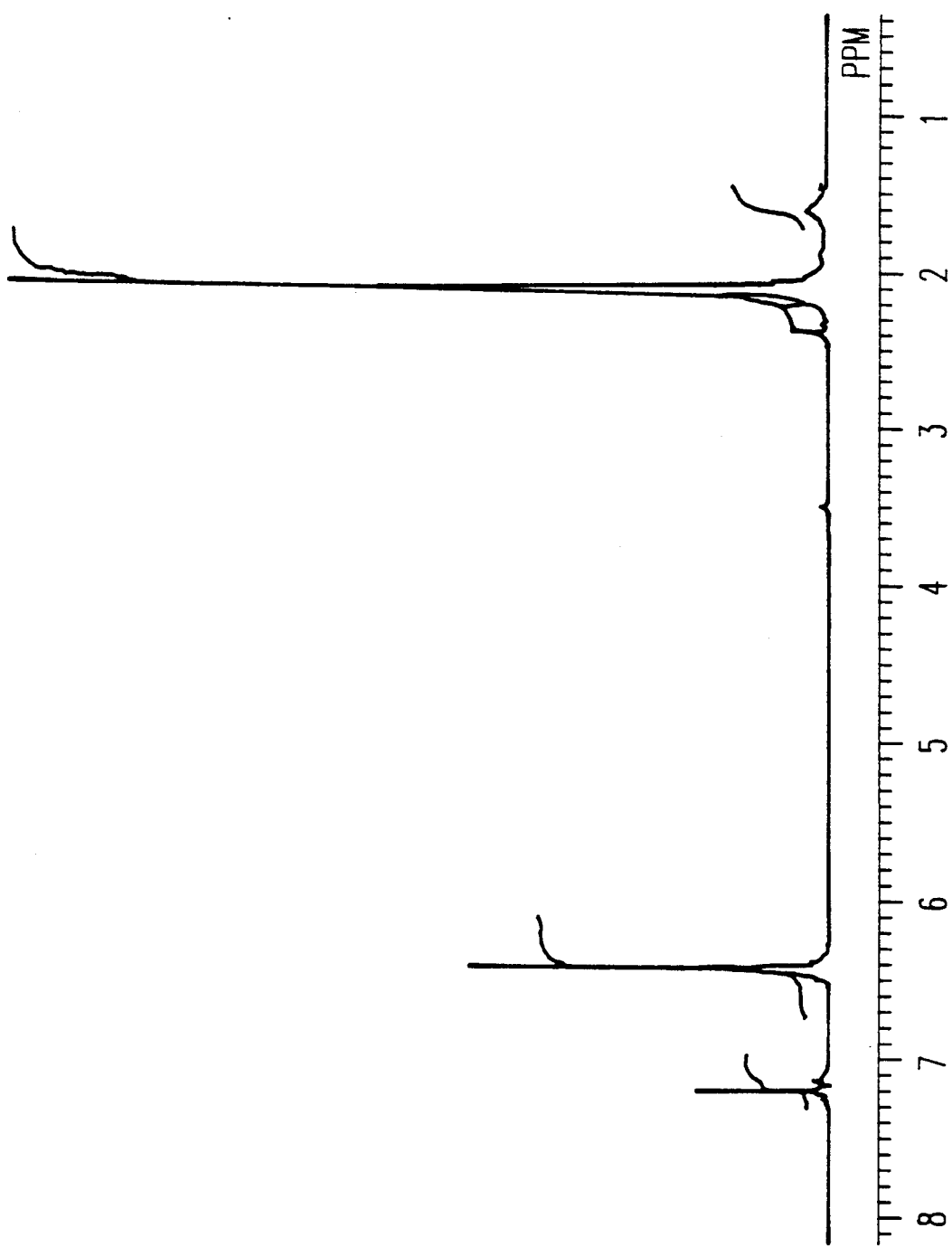

Under nitrogen atmosphere, 10 parts of PPE (intrinsic viscosity: 0.49 dl/g) containing 5.1 mole % of allyl group was dissolved in 200 parts of tetrahydrofuran (hereinafter abbreviated to as "THF"), and at a temperature of 50° C., 3.6 parts of a THF solution containing borane-THF complex (borane concentration: 1 mole/liter) was added to the solution to cause precipitates immediately. After refluxing for 3.5 hours, a resin was precipitated by adding a large amount of methanol to obtain a borane-modified PPE. $^1$H-NMR charts of the PPE used and the borane-modified PPE are shown in FIGS. 1 and 2, respectively.

Yield: 99%, Reaction rate of the allyl group: 100%.

EXAMPLE 1b

Under the same conditions as in Example 1a, to 10 parts of PPE (intrinsic viscosity: 0.57 dl/g) containing 0.6 mole % of allyl group was added 1.9 parts of the borane solution used in Example 1a, and then the mixture was refluxed for 40 minutes to obtain a borane-modified PPE.

Yield: 97%, Reaction rate of the allyl group: 100%.

EXAMPLE 1c

Figure 3:
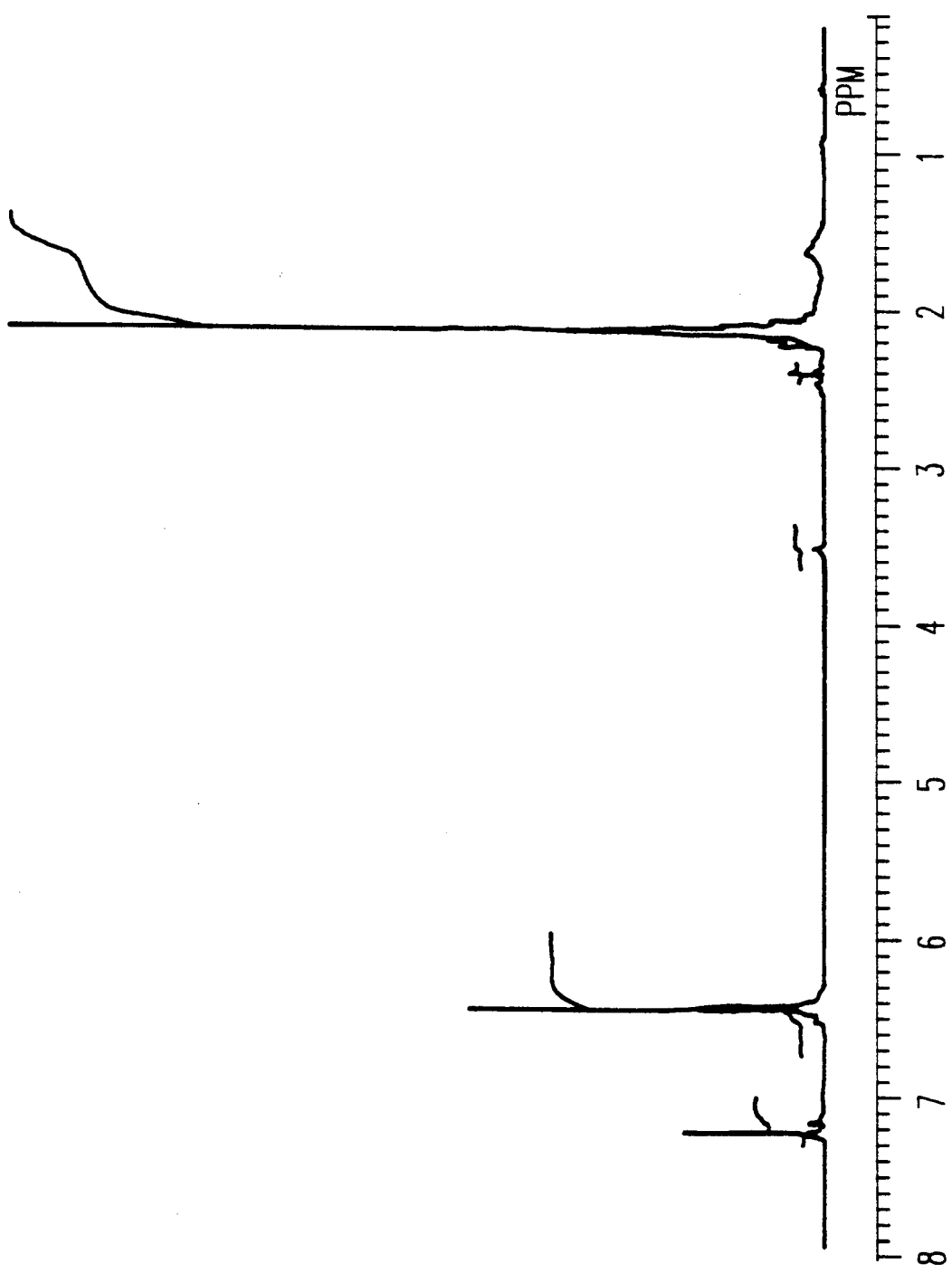
FIG. 3 is a $^1$H-NMR chart of the borane-modified PPE obtained in Example 1c.

To 10 parts of the PPE which is the same as that used in Example 1a was added 38 parts of THF solution containing 0.5 mole/liter of 9-BBN and the reaction was carried out under the same conditions as in Example 1b to obtain a borane-modified PPE. In this case, no gelation was occurred. $^1$H-NMR chart of the obtained borane-modified PPE is shown in FIG. 3.

Yield: 98%, Reaction rate of the allyl group: 100%.

EXAMPLE 1d

To 10 parts of PPE which is the same as that used in Example 1a and dissolved in 89 parts of THF was added 1.9 parts of the borane solution used in Example 1a, and the mixture was reacted at room temperature for 30 minutes to obtain a borane-modified PPE.

Yield: 95%, Reaction rate of the allyl group: 51%.

EXAMPLE 2a

In 1770 parts of THF was dissolved 100 parts of PPE (intrinsic viscosity: 0.49 dl/g) containing 5.1 mole % of allyl group and then 3.6 parts of a borane-THF complex (THF solution, borane concentration: 1 mole/liter) was added to the mixture at 50° C., and the mixture was refluxed for 2.5 hours. A large amount of methanol was added to the mixture to precipitate a resin whereby the desired borane-modified PPE was obtained.

Yield: 99%, Reaction rate of the allyl group: 100%.

Figure 4:
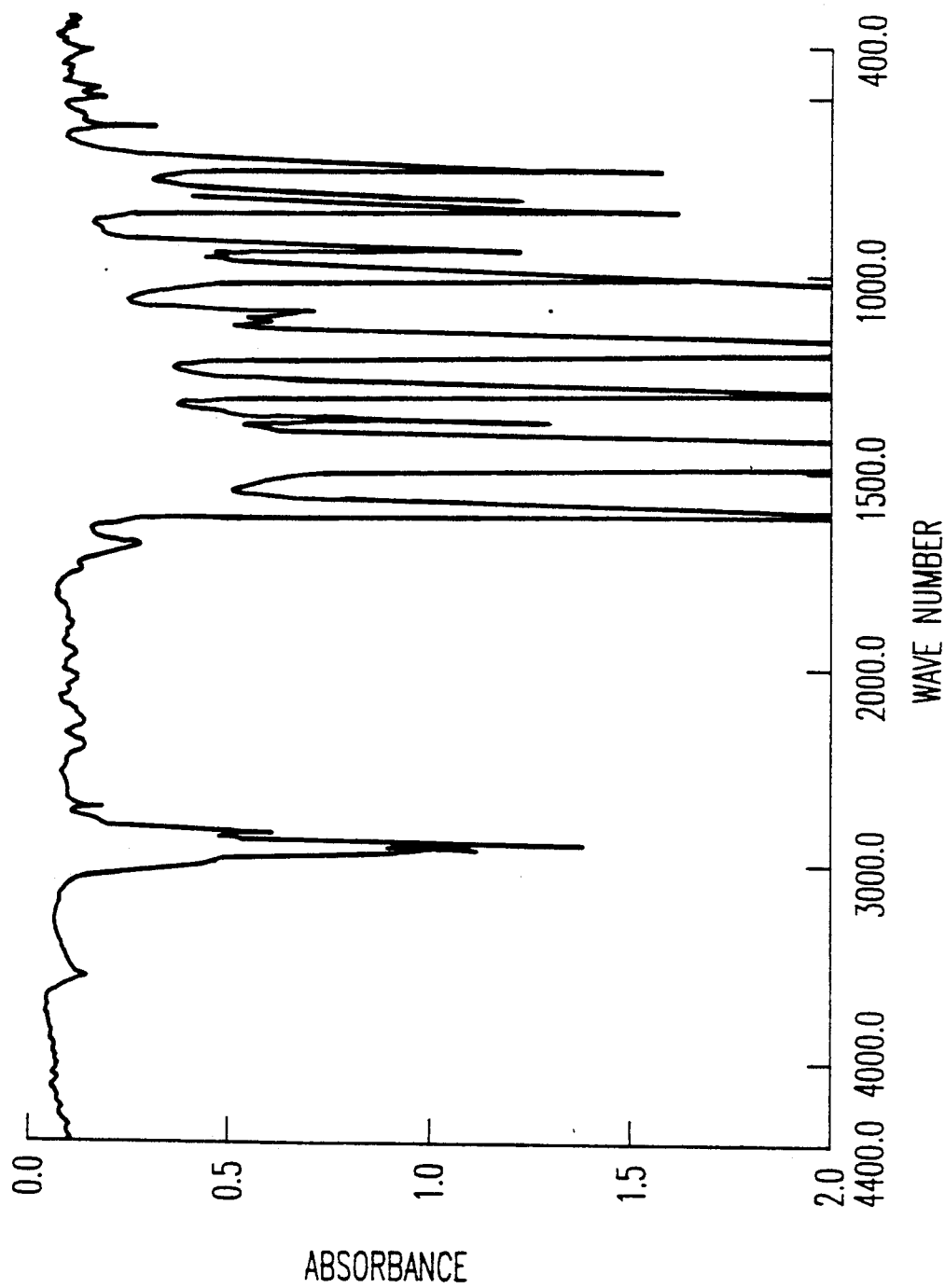

Ten parts of the above borane-modified PPE was swelled in 169 parts of THF and after setting the temperature to 40° C., an aqueous sodium hydroxide solution (pure water: 7.5 parts and sodium hydroxide: 0.5 part) was added and 2.5 parts of an aqueous 30% hydrogen peroxide solution was added dropwise to the mixture. The mixture was the reacted at 40° C. for 2 hours. A large amount of methanol was added to the mixture to precipitate a resin whereby the desired alcoholic hydroxyl group-modified PPE was obtained. Infrared absorption spectrum of the resulting alcoholic hydroxyl group-modified PPE is shown in FIG. 4.

Yield: 92%, Conversion rate of the hydroxyl group: 63%.

A formed amount of the alcoholic hydroxyl group is calculated by $^1$H-NMR from an integrated intensity of signals derived from methylene group protons bonded to the hydroxyl group at 3.55 ppm.

EXAMPLE 2b

Figure 5:
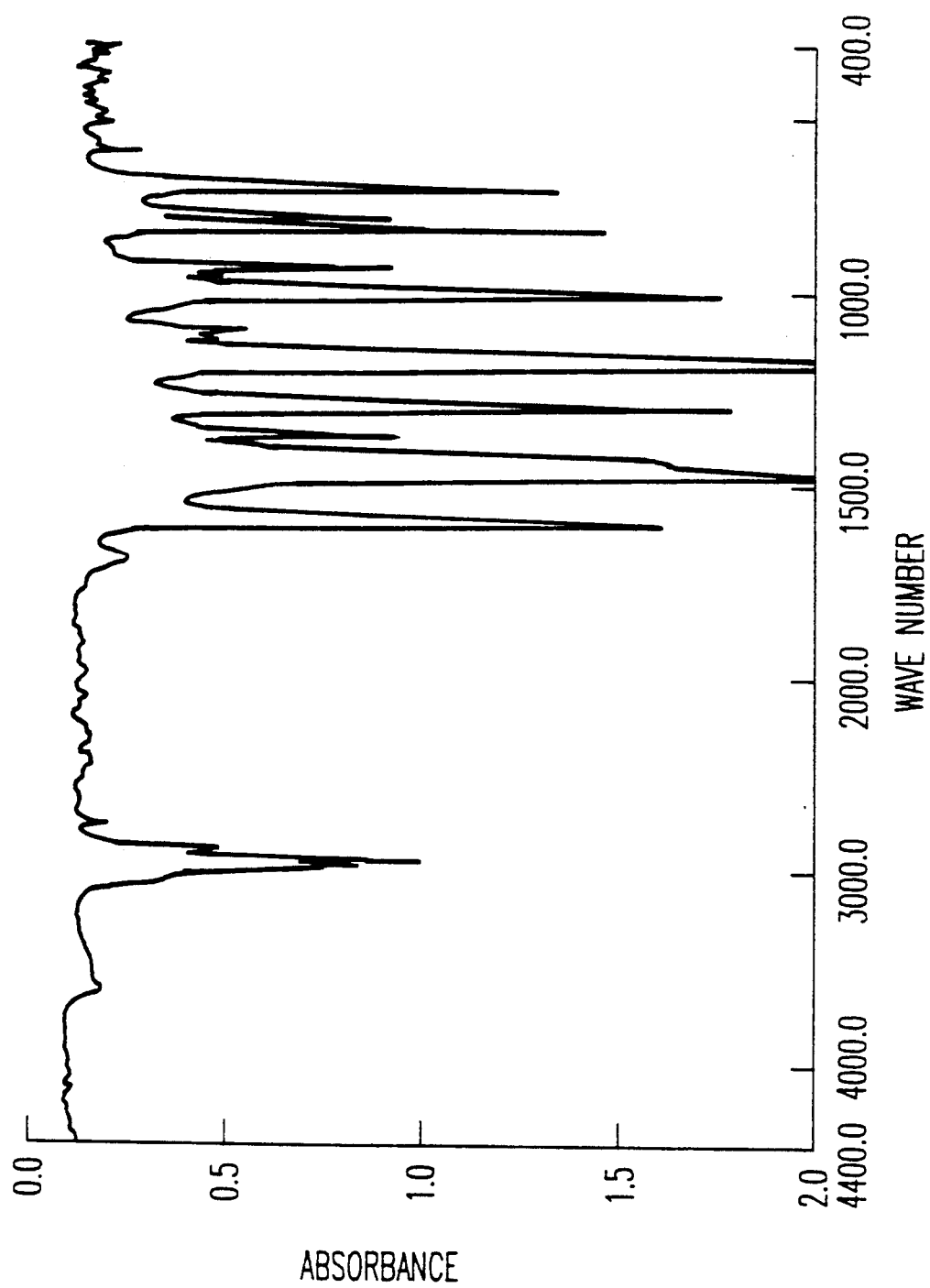
FIG. 5 is an infrared absorption spectrum of the alcoholic hydroxyl group-modified PPE obtained in Example 2b.

In 354 parts of THF was dissolved 10 parts of PPE (intrinsic viscosity: 0.42 dl/g) containing 8.5 mole % of allyl group and then 3.2 parts of a borane-THF complex which is the same as that used in Example 2a was added to the mixture at 50° C., and the mixture was refluxed for one hour. After cooling the temperature to 40° C. and adding an aqueous sodium hydroxide solution (pure water: 12 parts and sodium hydroxide: 0.84 part) to the mixture, 7.8 parts cf an aqueous 30% hydrogen peroxide solution was added dropwise to effect the reaction for 30 minutes. A large amount of methanol was added to the mixture to precipitate a resin and the resin was washed with hot water and methanol to obtain an alcoholic hydroxyl group-modified PPE. Infrared absorption spectrum of the resulting alcoholic hydroxyl group-modified PPE is shown in FIG. 5.

Yield: 92%, Conversion rate of the hydroxyl group: 82%.

EXAMPLE 2c

In the same manner as in Example 2b except for using 10 parts of PPE (intrinsic viscosity: 0.57 dl/g) containing 0.6 mole % of allyl group, 180 parts of THF, 0.9 part of the borane-THF complex which is the same as that used in Example 2a, an aqueous sodium hydroxide solution (pure water: 1 part and sodium hydroxide: 0.07 part) and 0.56 part of an aqueous 30% hydrogen peroxide solution, and subjecting to the post-treatment, an alcoholic hydroxyl group-modified PPE was obtained.

Yield: 93%, Conversion rate of the hydroxyl group: −100%.

EXAMPLE 3a

In 130 parts of xylene were dissolved 10 parts of PPE (intrinsic viscosity: 0.47 dl/g) containing 4.5 mole % of allyl group and 3.6 parts of maleic anhydride, and the mixture was heated to 110° C., 0.36 part of benzoyl peroxide (BPO) dissolved in 17 parts of xylene was added dropwise to the mixture over 1.5 hours. After dropwise addition, the reaction was further continued for 2.5 hours and a resin was precipitated by adding acetone to obtain a maleic anhydride-modified PPE.

A maleic anhydride content and yield of the resulting modified PPE are shown in Table 1.

The maleic anhydride content was measured in chloroform solvent by the neutralization titration method using a methanol solution of potassium hydroxide with phenolphthalein as an indicator.

EXAMPLE 3b

In the same manner as in Example 3a except for using PPE (intrinsic viscosity: 0.42 dl/g) containing 8.5 mole % of allyl group, maleic anhydride and BPO with amounts shown in Table 1, respectively, the reaction was carried out. The results are summarized in Table 1.

COMPARATIVE EXAMPLE 1

In the same manner as in Example 3a except for using PPE (intrinsic viscosity: 0.42 dl/g) comprising 2,6-xylenol homopolymer in place of PPE used in Example 3a, the reaction was carried out The results are also shown in Table 1.

TABLE 1

|  | PPE (part) | Allyl group content (mole %) | Maleic anhydride charged amount (part) | BPO (part) | Maleic anhydride content (% by weight) | Yield (%) |
| --- | --- | --- | --- | --- | --- | --- |
| Example 32 | 10 | 4.5 | 3.6 | 0.36 | 1.5 | 77 |
| Example 33 | 10 | 8.5 | 6.9 | 0.69 | 2.2 | 78 |
| Comparative example 1 | 10 | 0.0 | 3.6 | 0.36 | 0.68 | 83 |

EXAMPLE 4a

In 430 parts of toluene were dissolved 50 parts of PPE containing 18.3 mole % of allyl group and 19.3 parts of mercaptoacetic acid. By maintaining the temperature to 85° C., 3.4 parts of azobisisobutyronitrile (hereinafter abbreviated to as "AIBN") dissolved in 8.7 parts of toluene was added dropwise to the mixture over 1.5 hours. After dropwise addition, the mixture was further reacted at 85° C. for 4 hours. A resin was precipitated by adding a large amount of acetonitrile to obtain the desired carbonyl group-modified PPE. Yield thereof and the reaction rate of the allyl group are shown in Table 2.

EXAMPLES 4b TO 4e

In the same manner as in Example 4a except for using PPE, mercaptoacetic acid and AIBN with amounts shown in Table 2, the reaction was carried out. The results are shown in Table 2.

Figure 6:
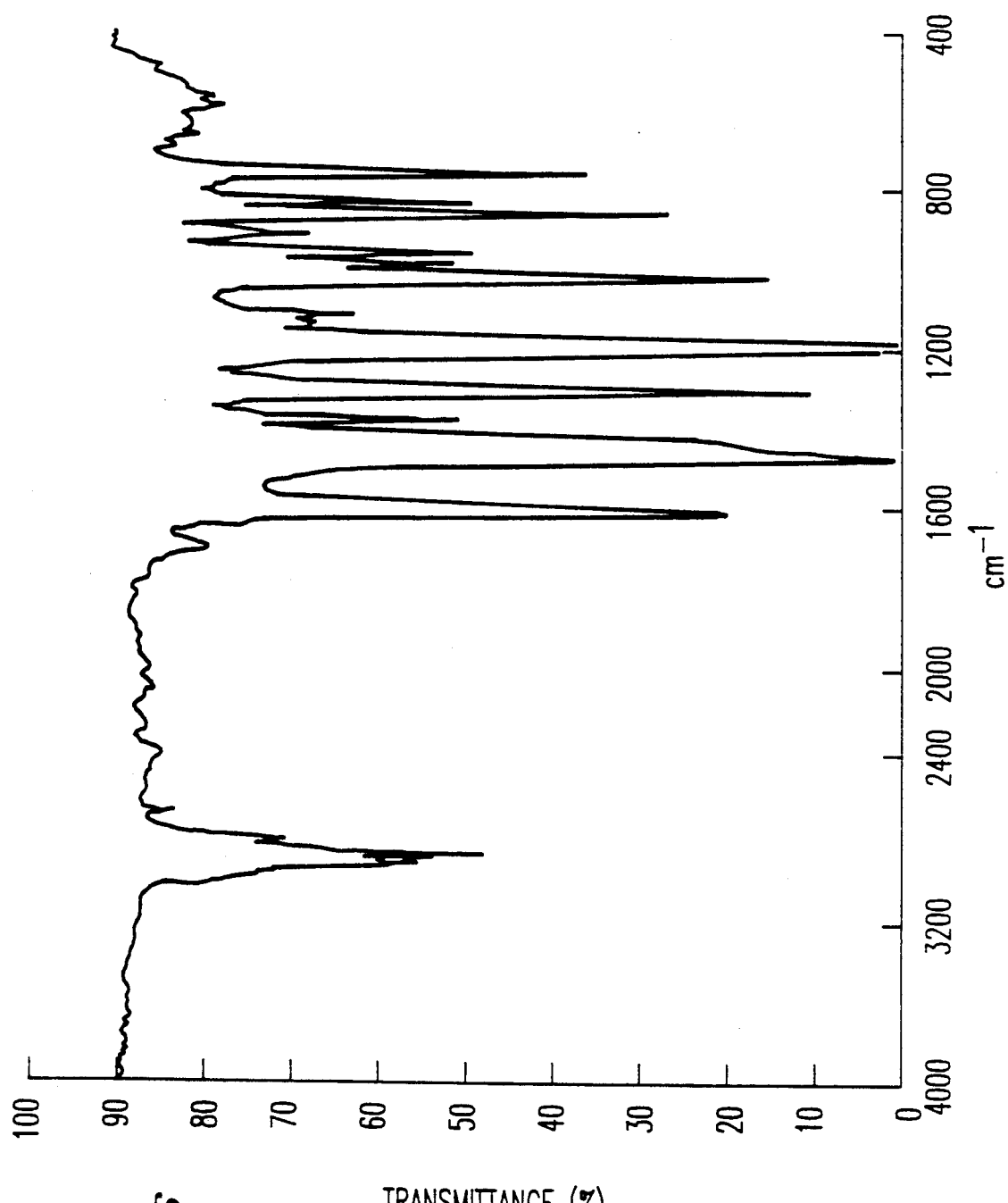
FIG. 6 is an infrared absorption spectrum of PPE used in Example 4c.
Figure 7:
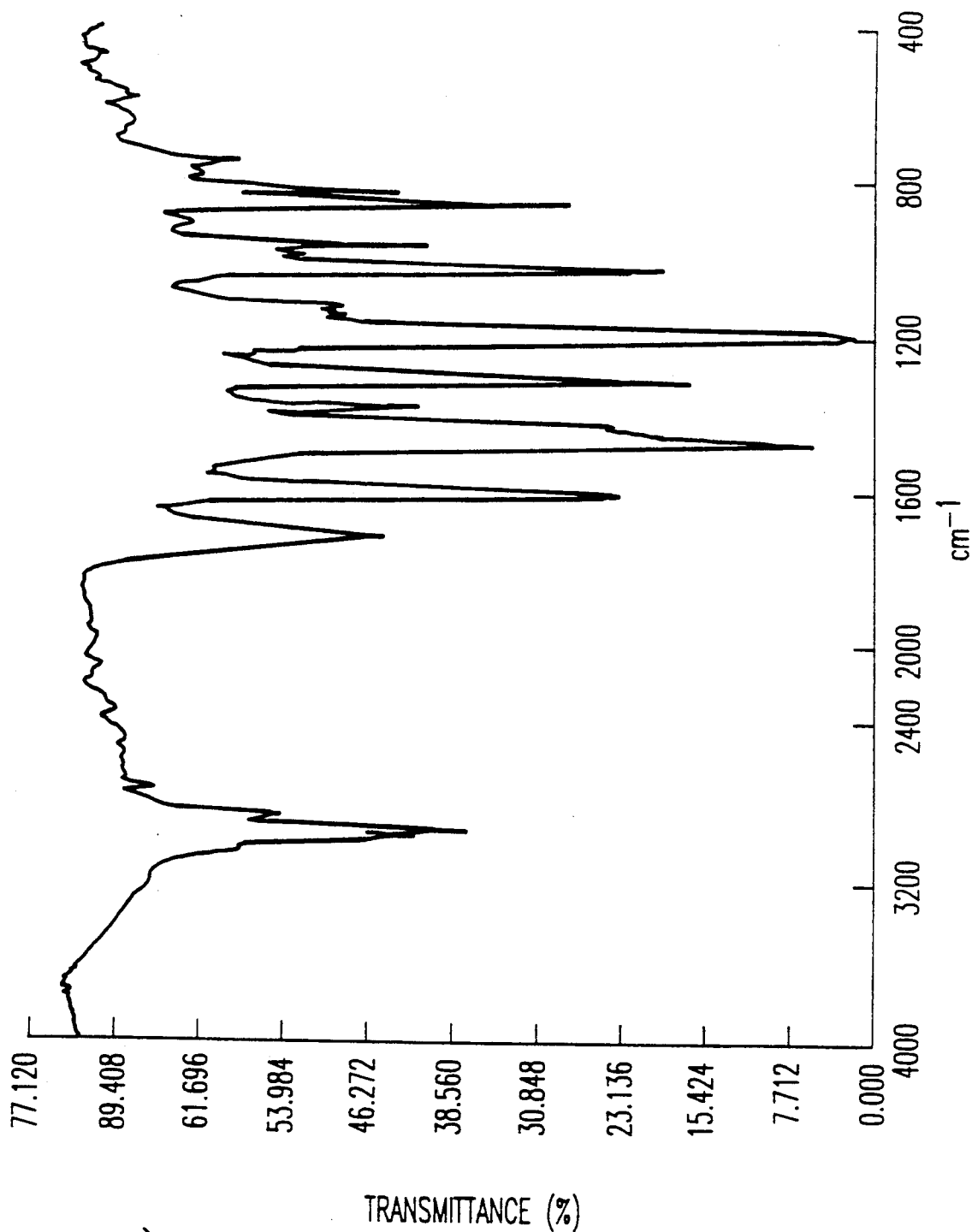
FIG. 7 is an infrared absorption spectrum of the carbonyl group-modified PPE obtained in Example 4c.

Infrared spectra of PPE used in Example 4c and the carbonyl group-modified PPE obtained in Example 4c are shown in FIGS. 6 and 7, respectively.

TABLE 2

|  | Allyl group content of PPE (mole %) | Mercaptoacetic acid/allyl group (molar ratio) | AIBN/mercaptoacetic acid (molar ratio) | Yield of modified PPE (%) | Reaction rate of allyl group (%) |
| --- | --- | --- | --- | --- | --- |
| Example 4a | 18.3 | 2.6 | 0.1 | 92 | c.a. 100 |
| Example 4b | 18.3 | 2.6 | 0.05 | 93 | 53 |
| Example 4c | 18.3 | 1.3 | 0.4 | 92 | 69 |
| Example 4d | 18.3 | 27 | 0.08 | 99 | c.a. 100 |
| Example 4e | 4.5 | 7.5 | 0.1 | 100 | c.a. 100 |

EXAMPLE 4f

In 550 parts of chlorobenzene were dissolved 50 parts of PPE which is the same as that used in Example 4a and 19.3 parts of mercaptoacetic acid. By maintaining the temperature to 95° C., 5.1 parts of benzoyl peroxide (hereinafter abbreviated to as "BPO") dissolved in 11 parts of chlorobenzene was added dropwise to the mixture over 1.5 hours. After dropwise addition, the mixture was further reacted at 95° C. for 4 hours. A resin was precipitated by adding a large amount of acetonitrile to obtain the desired carbonyl group-modified PPE. The results are shown in Table 3.

EXAMPLES 4g TO 4i

In the same manner as in Example 4f except for changing the charged amount of mercaptoacetic acid, the reaction was carried out. The results are shown in Table 3.

EXAMPLE 4j

Under nitrogen atmosphere, in 733 parts of chlorobenzene were dissolved 50 parts of PPE which is the same as that used in Example 4a and 199 parts of mercaptoacetic acid. By maintaining the temperature at 50° C. and while irradiating ultraviolet rays, the reaction was carried out for 9 hours. A resin was precipitated by adding a large amount of acetonitrile to obtain the desired carbonyl group-modified PPE. The results are shown in Table 3.

TABLE 3

|  | Allyl group content of PPE (mole %) | Mercaptoacetic acid/allyl group (molar ratio) | BPO/mercaptoacetic acid (molar ratio) | Yield of modified PPE (%) | Reaction rate of allyl group (%) |
| --- | --- | --- | --- | --- | --- |
| Example 4f | 18.3 | 2.6 | 0.2 | 96 | 29 |
| Example 4g | 18.3 | 1.3 | 0.2 | 94 | 18 |
| Example 4h | 18.3 | 3.9 | 0.2 | 96 | 69 |
| Example 4i | 18.3 | 8.0 | 0.2 | 75 | c.a. 100 |
| Example 4j | 18.3 | 27 | — | 99 | c.a. 100 |

EXAMPLES 5a

In 430 parts of toluene were dissolved 50 parts of PPE containing 9.2 mole % of allyl group and 15.6 parts of 2mercaptoethanol. By maintaining the temperature to 85° C., 4.0 parts of AIBN dissolved in 173 parts of toluene was added dropwise to the mixture over 1.5 hours. After dropwise addition, the mixture was further reacted at 85° C. for 4 hours. A resin was precipitated by adding a large amount of acetonitrile to obtain the desired hydroxyl group-modified PPE. Recovered rate of PPE and the reaction rate of the allyl group are shown in Table 4.

EXAMPLES 5b TO 5e

In the same manner as in Example 5a except for using PPE, 2-mercaptoethanol and AIBN with amounts shown in Table 4, the reaction was carried out. The results are shown in Table 4.

EXAMPLE 5f

Figure 8:
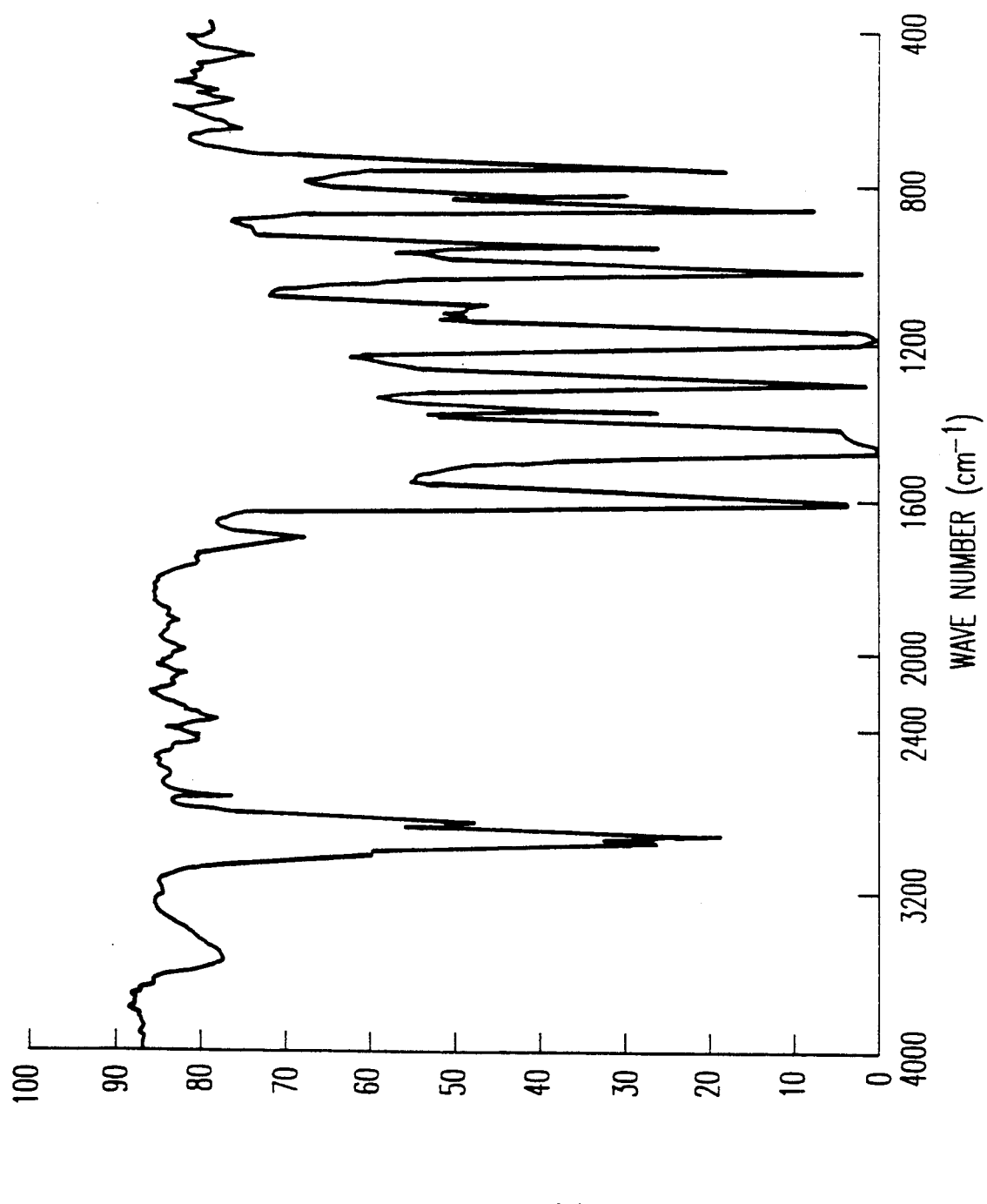
FIG. 8 is an infrared absorption spectrum of the hydroxyl group-modified PPE obtained in Example 5f.

In 430 parts of toluene were dissolved 50 parts of PPE which is the same as that used in Example 5a and 30.0 parts of 2-mercaptoethanol. By maintaining the temperature to 70° C., 10.0 parts of AIBN dissolved in 173 parts of toluene was added dropwise to the mixture over 2.5 hours. After dropwise addition, the mixture was further reacted at 70° C. for 5.5 hours. A resin was precipitated by adding a large amount of acetonitrile to obtain the desired hydroxyl group-modified PPE. The results are shown in Table 4. Infrared absorption spectrum of the hydroxyl group-modified PPE is shown in FIG. 8.

TABLE 4

|  | Allyl group content of PPE (mole %) | 2-Mer- capto- ethanol (part) | AIBN (part) | PPE recovered rate (%) | Reaction rate of allyl group (%) |
|---|---|---|---|---|---|
| Example 5a | 9.2 | 15.6 | 4.0 | 98 | 23 |
| Example 5b | 9.2 | 30.0 | 4.0 | 99 | 42 |
| Example 5c | 9.2 | 30.0 | 10.0 | 99 | 70 |
| Example 5d | 3.0 | 10.0 | 2.0 | 93 | 12 |
| Example 5e | 1.5 | 9.8 | 3.0 | 94 | 43 |
| Example 5f | 9.2 | 30.0 | 10.0 | 100 | 78 |

EXAMPLE 6a

In 430 parts of toluene were dissolved 50 parts of PPE containing 9.2 mole % of allyl group and 83.1 parts of 3-mercaptopropyltrimethoxysilane (hereinafter abbreviated to as "MPS"). By maintaining the temperature to 85° C., 5.0 parts of AIBN dissolved in 258 parts of toluene was added dropwise to the mixture and the mixture was reacted for 5 hours. A resin was precipitated by adding a large amount of acetonitrile to obtain the desired alkoxysilyl group-modified PPE. Recovered rate of PPE, the content of the trimethoxysilyl group and the reaction rate of the allyl group are shown in Table 5.

The content of the trimethoxysilyl group was calculated by ¹H-NMR and the ratio of the trimethoxysilyl group to that of the benzene ring in PPE was shown by mole %.

Figure 9:
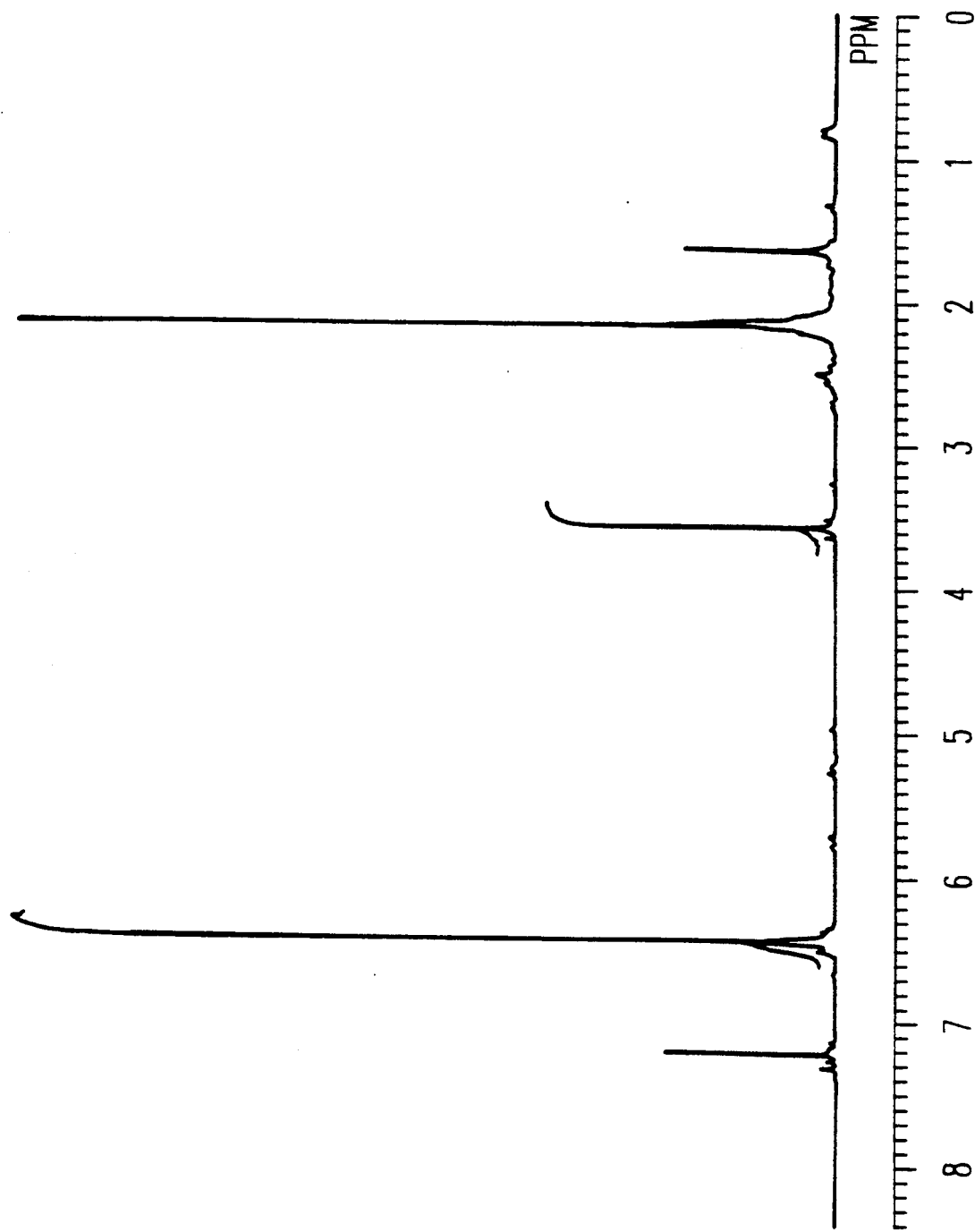

¹H-NMR chart of the alkoxysilyl group-modified PPE is shown in FIG. 9.

EXAMPLES 6b TO 6g

In the same manner as in Example 6a except for using PPE, MPS and AIBN with amounts shown in Table 5, the reaction was carried out. The results are shown in Table 5.

EXAMPLE 6h

Under nitrogen atmosphere, in 430 parts of toluene were dissolved 50 parts of PPE which is the same as that used in Example 6a and 41.6 parts of MPS, and by maintaining the temperature to 50° C., the reaction was carried out for 9 hours while irradiating ultraviolet rays. A resin was precipitated by adding a large amount of acetonitrile to obtain the desired alkoxysilyl group-modified PPE. The results are shown in Table 5.

TABLE 5

|  | Allyl group content of PPE (mole %) | MPS (part) | AIBN (part) | PPE re- covered rate (%) | Silyl group content (mole %) | Reaction rate of allyl group (%) |
|---|---|---|---|---|---|---|
| Example 6a | 9.2 | 83.1 | 5.0 | 100 | 7.5 | 84 |
| Example 6b | 9.2 | 41.6 | 5.0 | 100 | 4.3 | 50 |
| Example 6c | 9.2 | 16.6 | 5.0 | 98 | 2.0 | 32 |
| Example 6d | 9.2 | 41.6 | 10.0 | 100 | 6.5 | 84 |
| Example 6e | 9.2 | 41.6 | 3.0 | 100 | 4.5 | 44 |
| Example 6f | 1.5 | 12.3 | 3.0 | 98 | 0.4 | 39 |
| Example 6g | 1.5 | 6.1 | 3.0 | 98 | 0.2 | 31 |
| Example 6h | 9.2 | 41.6 | 0* | 98 | 2.3 | 31 |

*UV rays irradiation

EXAMPLE 7

In 87 parts of toluene were dissolved 10 parts of PPE containing 9.0 mole % of allyl group (intrinsic viscosity: 0.3 dl/g) and 4.4 parts of maleic anhydride, and then 8.8 parts of a toluene solution containing 2.3% of 2,2′-azobisisobutyronitrile was gradually added dropwise to the solution at 85° C. and the mixture was reacted for 5 hours. The reaction mixture was precipitated again in a large amount of acetonitrile and washed to obtain the desired maleic anhydride-modified PPE.

Yield: 87%

Maleic anhydride content: 2.0

COMPARATIVE EXAMPLE 2

In 111 parts of chlorobenzene were dissolved 10 parts of PPE (intrinsic viscosity: 0.3 dl/g) and 2.5 parts of maleic anhydride, and the mixture was reacted at 130° C. for 7 hours. The reaction mixture was precipitated again by a large amount of acetone and washed to obtain the desired maleic anhydride-modified PPE.

Yield: 84%

Maleic anhydride content: 0.3% v

APPLICATION EXAMPLE 1

Dry blend was effected by mixing 40 parts by weight of the maleic anhydride-modified PPE obtained in Example 7 and 60 parts by weight of nylon 6 (produced by BASF Co., trade name: Ultramid KR 4411). This mixture was kneaded by using Laboplastomill manufactured by Toyo Seiki K.K. at a temperature of 250° C. for 10 minutes and then press molded to a sheet with a thickness of 2 mm. Compatibility of the resin and Izod impact strength of the sheet are shown in Table 6.

APPLICATION EXAMPLE 2

Dry blend was effected by mixing 8 parts by weight of the maleic anhydride-modified PPE obtained in Example 7, 32 parts by weight of PPE (produced by Nippon Polyether Co., H-30 grade) and 60 parts by weight of nylon 6 (produced by BASF Co., trade name: Ultramid KR 4411). This mixture was kneaded by using Laboplastomill manufactured by Toyo Seiki K.K. at a temperature of 250° C. for 5 minutes and then press molded to a sheet with a thickness of 2 mm. Compatibility of the resin and Izod impact strength of the sheet are shown in Table 6.

COMPARATIVE APPLICATION EXAMPLE 1

In the same manner as in Application example 1 except for using the maleic anhydride-modified PPE prepared in Comparative example 2 in place of the maleic anhydride-modified PPE prepared in Example 7, a sheet was prepared. Compatibility of the resin and Izod impact strength of the sheet are shown in Table 6.

TABLE 6

|  | Maleic anhydride-modified PPE (parts) | Polyamide resin (parts) | PPE (parts) | Compatibility[a] | Izod impact test[b] |
|---|---|---|---|---|---|
| Application example 1 | 40 | 60 | 0 | 11 | 45 |
| Application example 2 | 8 | 60 | 32 | 19 | 45 |
| Comparative application example 1 | 40 | 60 | 0 | 100 | 40 |

[a] A ratio of interfacial tensions is shown based on the Wu's formula (Polymer Engineering and Science, Mid-March, 1987, vol. 27, No. 5, pages 335–343). The data are shown as the value of Comparative application example 1 as 100.
[b] Resin composition was subjected to press-molding at 280° C. to prepare a sheet with a thickness of 2 mm. Izod impact strength of the sheet without notch was measured at 23° C. according to JIS K 7110.

EXAMPLE 8

In 100 parts of tetrahydrofuran was dissolved 10 parts of PPE (intrinsic viscosity: 0.3 dl/g) with an allyl group content of 2.4 mole %. After addition of 7.2 parts of 9-borabicyclo[3.3.1]nonane at 50° C., the mixture was reacted for 2 hours. Then, the temperature was made 40° C., an aqueous sodium hydroxide solution (5 parts of pure water and 0.3 part of sodium hydroxide) was added and 7 parts of a 9% aqueous hydrogen peroxide solution was added dropwise. The mixture was reacted at 50° C. for 2 hours, and then the resin was precipitated by a large amount of methanol, washed with hot water and methanol to obtain the alcoholic hydroxyl group-modified PPE.

Yield: 93%
Hydroxyl group conversion rate: c.a. 100%
Hydroxyl group content: 2.4 mole %

COMPARATIVE EXAMPLE 3

In an autoclave made of stainless steel with an inner volume of 10 liter were charged 4300 parts of xylene and 500 parts of non-modified PPE (intrinsic viscosity: 0.3 dl/g, produced by Nippon Polyether Co., H-30 grade), and the PPE was dissolved under stirring. Then, 20 parts of ethylene oxide was introduced under pressure to react them at 150° C. for 5 hours. After cooling, the reaction mixture was poured into 15600 parts of methanol and the precipitated polymer was collected by filtration, washed with methanol to obtain the alcoholic hydroxyl group-modified PPE in which the terminal hydroxyl group of the PPE was substituted by an aliphatic alcoholic hydroxyl group.

Yield: 99%
Hydroxyl group content: 1.2 mole %

APPLICATION EXAMPLE 3

Dry blend was effected by mixing 40 parts by weight of the alcoholic hydroxyl group-modified PPE obtained in Example 8 and 60 parts by weight of a maleic anhydride-modified propylene resin (produced by Mitsubishi Petrochemical Co., Ltd., trade name: MOD IC, maleic anhydride content: 0.6% by weight). This mixture was kneaded by using Laboplastomill manufactured by Toyo Seiki K.K. at a temperature of 230° C. for 10 minutes and then press molded to a sheet with a thickness of 2 mm. Test result of Izod impact strength of the sheet is shown in Table 7.

COMPARATIVE APPLICATION EXAMPLE 3

In the same manner as in Application example 3 except for using the alcoholic hydroxyl group-modified PPE prepared in Comparative example 3 in place of the alcoholic hydroxyl group-modified PPE prepared in Example 8, a sheet was prepared. Test result of Izod impact strength of the sheet is shown in Table 7.

COMPARATIVE APPLICATION EXAMPLE 4

In the same manner as in Application example 3 except for using the alcoholic hydroxyl group-modified PPE prepared in Example 5b in place of the alcoholic hydroxyl group-modified PPE prepared in Example 8, a sheet was prepared. Test result of Izod impact strength of the sheet is shown in Table 7.

PREPARATION EXAMPLE

Into 10 liter of a flask made of a glass and equipped with a stirrer, which had been sufficiently substituted with nitrogen, were charged 250 parts of propylene homopolymer resin powder (melt flow rate (MFR) measured at 230° C. according to ASTM D-1238:1 g/10 min) and 75 parts of 2-hydroxyethyl methacrylate, and then 5535 parts of chlorobenzene was added thereto. The mixture was stirred at 130° C. to completely dissolve the components and then cooled to 110° C. To the solution was added dropwise 20 parts of benzoyl peroxide dissolved in 554 parts of chlorobenzene over 2 hours, and after completion of the dropwise addition, the reaction was further continued at 110° C. for 3 hours. The resulting reaction mixture was poured into 11900 parts of acetone to precipitate the formed product and the precipitated product was washed. This procedure was repeated three times and then the product was dried under reduced pressure to obtain a graft modified resin. The 2-hydroxylethyl methacrylate content of the graft modified resin was 0.9% by weight according to the infrared spectral analysis. Also, MFR was 17.4 g/10 min. According to the above procedure, a hydroxyl group-modified polypropylene was obtained.

APPLICATION EXAMPLE 5

Dry blend was effected by mixing 40 parts of the alkoxysilyl group-modified PPE obtained in Example 6d and 60 parts of the alcoholic hydroxyl group-modified propylene resin obtained by the above Preparation example. This mixture was kneaded by using Laboplastomill manufactured by Toyo Seiki K.K. at a temperature of 230° C. for 10 minutes and then press molded to a sheet with a thickness of 2 mm. Test result of Izod impact strength of the sheet is shown in Table 7.

TABLE 7

|  | Izod impact strength[a] (kg · cm/cm²) | Dispersed particle size[b] (μm) |
|---|---|---|
| Application example 3 | 13.6 | 1 to 2 |
| Application example 4 | 14.3 | 1 to 2 |
| Application example 5 | 6.5 | 1 to 3 |
| Comparative | 10.2 | 2 to 10 |

TABLE 7-continued

| | Izod impact strength[a] (kg·cm/cm²) | Dispersed particle size[b] (μm) |
|---|---|---|
| application example 2 | | |

[a] Resin composition was subjected to press-molding at 280° C. to form a sheet with a thickness of 2 mm. Izod impact strength of the sheet without notch was measured at 23° C. according to JIS K 7110.
[b] After ion etching the test piece, it was observed by the scanning type electron microscope.

We claim:

1. A process for preparing a carbonyl group-modified polyphenylene ether which comprises reacting a mercaptan having a carbonyl group and represented by the formula:

$$(HS)_m-R^3-(COR^4)_n$$

wherein m and n each represent an integer of 1 to 4, $R^3$ represents a divalent to hexavalent saturated aliphatic hydrocarbon group having one to 29 carbon atoms or an aromatic hydrocarbon group, and $R^4$ represents an alkali metal oxy group, a hydroxyl group, an aryloxy group, an alkyloxy group or a hydrocarbonoxy group, with a polyphenylene ether having a carbon-carbon unsaturated bond in a substituent.

2. The process according to claim 1, wherein said polyphenylene ether contains 2-allyl-6-methylphenol unit.

3. The process according to claim 1, wherein said polyphenylene ether is a copolymer of 2-allyl-6-methylphenol and 2,6-dimethylphenol.

4. The process according to claim 1, wherein said mercaptan is mercaptoacetic acid, 2-mercaptopropionic acid, mercaptosuccinic acid or ethyl mercaptoacetate.

5. The process according to claim 1, wherein said mercaptan is 2-mercaptopropionic acid, 2-mercaptopropionic acid, 3-mercaptopropionic acid, thiosalicylic acid, methyl 3-mercaptopropionate, ethyl 2-mercaptopropionate, or sodium mercaptoacetate.

* * * * *